(12) United States Patent
Nielsen et al.

(10) Patent No.: US 6,901,421 B2
(45) Date of Patent: *May 31, 2005

(54) SYSTEM, METHOD AND COMPUTER PROGRAM PRODUCT FOR SIGNAL PROCESSING OF ARRAY DATA

(75) Inventors: Sandra A. Nielsen, Anaheim, CA (US); Richard O. Nielsen, Anaheim, CA (US)

(73) Assignee: The Boeing Company, Seattle, WA (US)

( * ) Notice: Subject to any disclaimer, the term of this patent is extended or adjusted under 35 U.S.C. 154(b) by 612 days.

This patent is subject to a terminal disclaimer.

(21) Appl. No.: 10/105,847

(22) Filed: Mar. 25, 2002

(65) Prior Publication Data

US 2003/0182336 A1 Sep. 25, 2003

(51) Int. Cl.⁷ .............................................. G06F 17/10
(52) U.S. Cl. ...................... 708/308; 708/319
(58) Field of Search ................. 708/300, 308, 708/319

(56) References Cited

U.S. PATENT DOCUMENTS

| | | | | |
|---|---|---|---|---|
| 4,319,347 A | * | 3/1982 | Savit | ............................ 367/52 |
| 4,596,007 A | * | 6/1986 | Grall et al. | .................... 367/92 |
| 5,253,308 A | | 10/1993 | Johnson | |
| 5,410,727 A | | 4/1995 | Jaffe et al. | |
| 5,655,131 A | | 8/1997 | Davies | |
| 6,173,388 B1 | | 1/2001 | Abercrombie et al. | |
| 6,181,643 B1 | | 1/2001 | Nielsen | |
| 6,275,920 B1 | | 8/2001 | Abercrombie et al. | |
| 2002/0171580 A1 | * | 11/2002 | Gaus et al. | ............ 342/357.06 |
| 2005/0009486 A1 | * | 1/2005 | Al-Dhahir et al. | .......... 455/213 |

OTHER PUBLICATIONS

Richard O. Nielsen; *Sonar Signal Processing*; 1991; 30 selected pages; International Standard Book No. 0–89006–453–9; Artech House, Inc.; Norwood, Massachusetts.

Winthrop W. Smith; *Comparison of Multi–Processor Power PC Board Architectures for Pulse–Doppler Radar Processing*; Aug. 13, 2001; pp. 1–7; DNA Enterprises, Inc.; available at <http://www.dnacomputingsolutions.com/products/whitepapers/Multiprocessor–Power–PC–Board–Architectures.pdf>.

Mark T. Shaw, Chester D. Loggins, Richard O. Nielsen; *Performance Verification Testing of a High–Resolution Side– Looking Sonar*; Dec. 2001; pp. 1–5; MTS 0–933957–29–7; available at <http://www.sonatech.com/tech_papers/Performance_SLS_web.pdf>.

David Brunke, Young Cho; *Optimization of Vertical and Horizontal Beamforming Kernels on the PowerPC G4 Processor with AltiVec Technology*; EE382C: Embedded Software Systems Final Report; pp. Abstract, 1–8; available at <http://www.ece.utexas.edu/~bevans/courses/ee382c/projects/spring00/brunke–cho/ProjectReport.pdf> ; (visited Jan. 2, 2002).

* cited by examiner

*Primary Examiner*—Chuong Dinh Ngo
(74) *Attorney, Agent, or Firm*—Alston & Bird LLP (57) ABSTRACT

A system is provided for processing digital data from an array of receiver elements. The system includes an input assembly interface and a processing element. The input assembly interface is capable of providing the digital data from the array of receiver elements. The processing element, in turn, is capable of providing an impulse response, and representing the digital data and impulse response vectorized receiver matrices and vectorized response matrices, respectively. The processing element can then signal condition the digital data, without corner turning, based upon the vectorized receiver matrices and the vectorized response matrices. Once the signal conditioning output has been computed, the digital data may be further processed by a beamformer and matched filter.

40 Claims, 3 Drawing Sheets

SYSTEM, METHOD AND COMPUTER PROGRAM PRODUCT FOR SIGNAL PROCESSING OF ARRAY DATA

FEDERALLY SPONSORED RESEARCH OR DEVELOPMENT

This invention was made with government support under Contract No. N00024-00-C-6103 awarded by the Department of the Navy. The government may have certain rights in this invention.

FIELD OF THE INVENTION

The present invention relates generally to arrays of sensors such as hydrophones and, more particularly, to systems and methods for signal processing of array data produced by sensors.

BACKGROUND OF THE INVENTION

In many modern data processing systems, such as active and passive sonar systems, radar systems, communications systems and ultrasound instrumentation systems, sensors are used to receive information for processing and/or analysis by the system. For example, active sonar systems project a beam-like sound wave signal into the water, and an object that is in the path of the signal reflects a portion of the signal back to sensors, such as hydrophones. The signal reflected back to the sonar is detected by the sensors and thereafter utilized by the sonar to locate the object in the water. One conventional sonar system includes a projector that projects a sound wave signal s(t) into the water. Portions of the signal projected from the projector are reflected from the object to a lower receiver and an upper receiver in the form of an echo signal. And from the echo signal, the sonar system can determine various attributes of the object, such as a vertical arrival angle that partially defines the position of the object with respect to the sonar system.

As is typical, many of these modern data processing systems include one or more arrays of many sensors, or receiver elements, such as eighty-eight receiver elements, with each of the receiver elements requiring its own analog conditioning electronics and analog-to-digital converter. Further, digital signal processing is typically required for the receiver elements. In this regard, data from the array of sensors are received by the system in such a manner that all elements from a single time sample are grouped together. But to process the data, most conventional systems require the data to first be organized by each element across all time samples. As such, the data must be reordered, "corner turned" or transposed, before the system can process the data.

In conventional sonar systems, for example, the digital signal processing or portions thereof is performed by hardware circuitry, or special purpose software running on arrays of digital signal processing devices. Whereas such hardware and special purpose software adequately perform the digital signal processing required, each method has drawbacks. In this regard, conventional sonar systems are often deployed on watercraft, such as unmanned undersea vehicles, and in some cases the resources associated with the watercraft, such as space, power, weight and processing capability, are limited. Thus, the inclusion of the digital processing circuitry can be prohibitive. With respect to digital processing special purpose software, the need to corner turn the data, which is memory input/output (I/O) intensive, slows down the digital processing because no computations are performed during corner turning. That is, data are simply moved from one location to another in preparation for processing at a next stage.

SUMMARY OF THE INVENTION

In light of the foregoing background, the present invention provides an improved system, method and computer program product for processing digital data from an array of i receiving elements. In contrast to many conventional systems, the system, method and computer program product do not require the hardware circuitry that can put undesirable burdens on the space, power, weight and processing capability of a sonar system within which it is employed. Also, the system, method and computer program product are capable of processing the digital data without corner turning the data in preparation for subsequent processing. As such, the system, method and computer program product of the present invention does not suffer from the undesirable slow down caused by corner turning, when no computations are performed during corner turning.

According to one embodiment, a system is provided for processing digital data from an array of i receiving elements, where the digital data comprises t time samples of receiver data for each receiving element. The system includes an input assembly interface, a processing element, and can include a beamformer and a matched filter. The input assembly interface is capable of providing the digital data from the array of receiving elements, where the digital data comprises receiver data, x(n), and where the receiver data x(n) comprises receiver data $x_i(n)$ for each receiving element in the array, where n represents each time sample. The array of receiving elements can include at least one subset, j, of a predetermined number, E, of receiving elements. In this embodiment, the input assembly interface is capable of providing the digital data from the subset(s). In this regard, the predetermined number of receiving elements E in the subset(s) equals a predefined number of bits simultaneously processed by the processing element divided by a number of bits included in each time sample of receiver data.

The processing element is capable of providing an impulse response vector h(w) including l coefficients corresponding to a length l low pass filter, where w represents each coefficient. In turn, the processing element is capable of representing the receiver data x(n) as a plurality of vectorized data matrices vx, and the impulse response vector h(w) as a plurality of vectorized response matrices vh. The digital data can have a sampling frequency of $f_s$ and, as such, the processing element can mix the digital data with a mixing frequency $f_m$ equal to the following:

$$f_m = \frac{f_s}{2a},$$

where a is selected from a group consisting of 2, 3 and 4. According to one embodiment, the receiver data for each receiving element $x_i(n)$ and the impulse response vector h(w) each comprises at least respective sub-group, k. In this embodiment, each sub-group of receiver data for each receiving element includes a plurality of time samples and each sub-group of the impulse response vector includes a plurality of coefficients, where each time sample for each receiving element and each coefficient of the impulse response vector belongs to a single sub-group of receiver data and response data, respectively. Each sub-group, k, of receiver data and each sub-group, k, of the impulse response vector can include a plurality of time samples and coefficients, respectively, separated from one another by a decimation integer, d, such that each sub-group of receiver data includes t/d time samples and each sub-group of the impulse response vector includes l/d coefficients. As such, the processing element is capable of representing the receiver data from the receiving elements as an array of vectorized data matrices including a vectorized data matrix, $vx_{jk}$, for each sub-group of each subset of receiving elements.

The processing element is also capable of representing the impulse response vector as an array of vectorized response matrices including a vectorized response matrix, $vh_k$, for each sub-group of the impulse response vector. In one embodiment, the processing element is further capable of converting the vectorized data matrix for each sub-group of each subset of receiving elements into at least one floating point vectorized data matrix, $vf_{jk}$. For example, the processing element can convert the vectorized data matrix for each sub-group of each subset of receiving elements into p floating point vectorized data matrices $vf_{jk1}$ through $vf_{jkp}$, where p equals E/F, E equals a predetermined number of receiving elements in at least one subset of the receiving elements, and F equals a predefined number of bits simultaneously processed by the processing element divided by a number of floating point bits.

Based upon the vectorized data matrices and the vectorized response matrices, the processing element is capable of signal conditioning the receiver data to thereby determine a signal conditioning output. The processing element can signal condition the receiver data based upon the following:

$$vc_{jkg} = vf_{jkg} \otimes vh_k,$$

where $\otimes$ represents sub-group by sub-group convolution, and where g equals integers 1 through p. Also, the processing element can signal condition the receiver data including decimating the low pass filter response according to the decimation integer, d, that equals a power of two.

According to one embodiment the processing element is capable of signal conditioning the receiver data based upon a relationship between the sampling frequency $f_s$ and the mixing frequency $f_m$. In this regard, when $f_s$ equals $4 \times f_m$ and the decimation integer d is at least 4, the processing element is capable of signal conditioning the receiver data according to the following:

$$y_{Rjg} = \sum_{x=1}^{d/2} (-1)^{x+1} vc_{j(2x-1)g}$$

$$y_{Ijg} = \sum_{x=1}^{d/2} (-1)^{x} vc_{j(2x)g},$$

where $y_{Rjg}$ and $y_{Ijg}$ equal the real and imaginary parts of the signal conditioning output, respectively. When $f_s$ equals $4 \times f_m$ and the decimation integer d is 2, the processing element signal conditions the receiver data by first multiplying every other coefficient of every sub-group of the vectorized response matrices, $vh_k$, by (−1) and thereafter signal conditioning the receiver data according to the following:

$$y_{Rjg}(n) = (-1)^n vc_{j1g}$$

$$y_{Ijg}(n) = (-1)^{n+1} vc_{j2g}$$

where n represents each time sample.

In contrast, when $f_s$ equals $8 \times f_m$ and the decimation integer d is at least 8, the processing element is capable of signal conditioning the receiver data according to the following:

$$y_{Rjg} = \frac{q}{\sqrt{2}} + \frac{r}{\sqrt{2}} + s$$

$$y_{Ijg} = \frac{q}{\sqrt{2}} - \frac{r}{\sqrt{2}} + w,$$

where $q = \sum_{x=1}^{d/4} (-1)^x vc_{j(4x)g}$, $r = \sum_{x=1}^{d/4} (-1)^{x+1} vc_{j(4x-2)g}$, $s = \sum_{x=1}^{d/4} (-1)^{x+1} vc_{j(4x-3)g}$ and $w = \sum_{x=1}^{d/4} (-1)^x vc_{j(4x-1)g}$.

And when $f_s$ equals $8f_m$ and the decimation integer d is 4, the processing element signal conditions the receiver data by first multiplying every other coefficient of every sub-group of the vectorized response matrices, $vh_k$, by (−1) and thereafter signal conditioning the receiver data according to the following:

$$y_{Rjg}(n) = (-1)^n \left\{ vc_{j1g} + \frac{1}{\sqrt{2}} vc_{j2g} - \frac{1}{\sqrt{2}} vc_{j4g} \right\}$$

$$y_{Ijg}(n) = (-1)^{n+1} \left\{ \frac{1}{\sqrt{2}} vc_{j2g} + vc_{j3g} + \frac{1}{\sqrt{2}} vc_{j4g} \right\}.$$

Once the processing element has signal conditioning the receiver data, the beamformer is capable of beamforming the signal conditioning output. Thereafter, the matched filter is capable of matched filtering the beamformed signal conditioning output. In addition, the present invention provides a method and computer program product for processing digital data from an array of i receiving elements.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
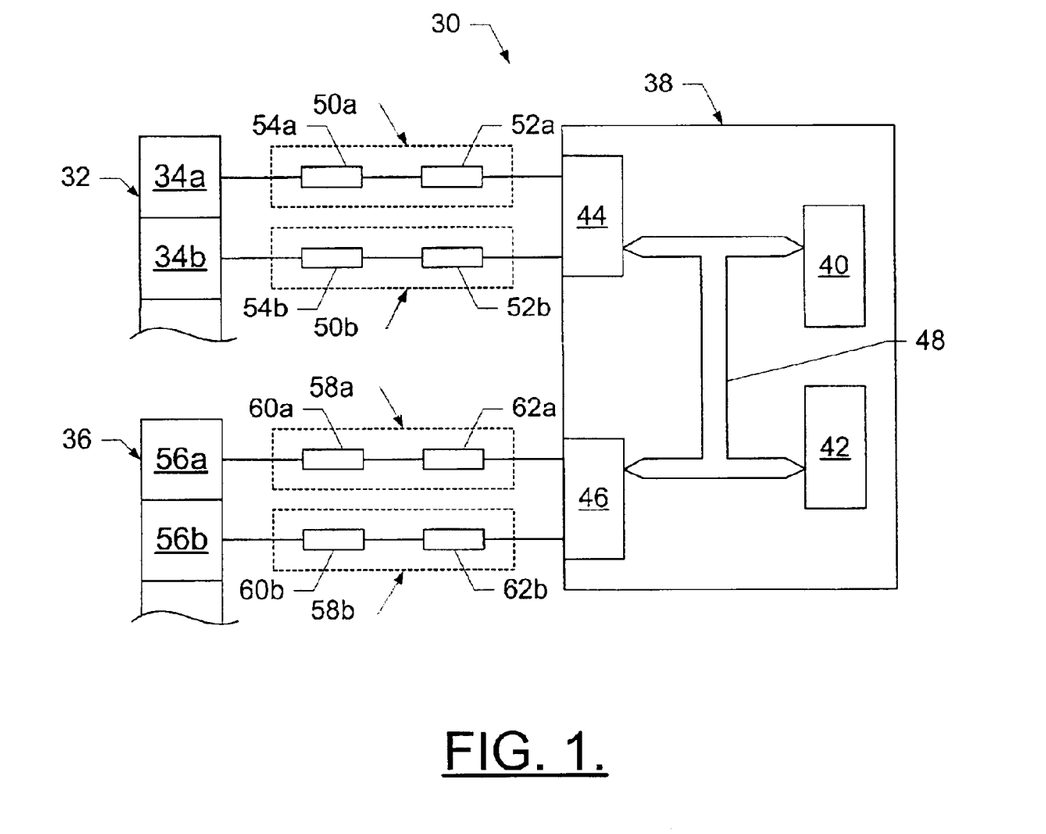
FIG. 1 is a block diagram illustrating portions of a sonar system that would benefit from one embodiment of the present invention.

Referring now to FIG. 1, one type of active sonar system 30 that would benefit from the real-time signal processing afforded by the present invention is depicted. It should be understood, however, that the active sonar system illustrated and hereinafter described is merely illustrative of one type of system that would benefit from the present invention and, therefore, should not be taken to limit the scope of the present invention. While several embodiments of the system are illustrated and will be hereinafter described for purposes of example, other types of systems can readily employ the real-time signal processing afforded by the present invention. Moreover, the system, method and computer program product of the present invention will be primarily described in conjunction with marine and submarine applications. But the system, method and computer program product of the present invention can be utilized in conjunction with a variety of other applications, both in the marine and submarine industries and outside of those industries. For example, the system, method and computer program product can be utilized in conjunction with passive sonar systems, as well as radar systems, communications systems and ultrasound instrumentation systems.

As best seen in FIG. 1, the active sonar system 30 includes a projector assembly 32 in the form of a one-dimensional array of N projector elements 34, two of which are illustrated in FIG. 1 and identified as projector element 34a and 34b. For example, there may be eighteen projector elements. One example of a suitable projector array is a projector array of an STA-020-0 Forward Looking Sonar, which is available from Sonatech, Inc. of Santa Barbara, Calif. The projector elements, which are preferably transducers, are conventional and should be understood by those skilled in the art. The projector elements are preferably vertically arranged and contiguous. Each of the projector elements projects one or more signals, which are most preferably sound waves that are projected into water. A reflected portion of the signals is received by a receiver assembly 36 of the sonar system, as described below.

The sonar system 30 further includes a computer-like device 38. Whereas a computer is shown in FIG. 1, the computer may be replaced with any device suitable for facilitating the operations of the present invention. The computer includes a processor 40 and a memory 42. The memory can include one or more read-only memories, random access memories, and data storage devices. The data storage devices may be in the form of one or more hard disks and drives therefor, floppy disks and drives therefor, CD-ROMs and drives therefor, digital video disks and drives therefor, memory cards, or the like. The computer further includes an output data interface 44 and an input data interface element 46, and user interface components (not shown). The components of the computer are operatively interconnected by a bus 48.

A separate output electronics assembly 50 extends between the output data interface 44 and each of the projector elements 34a and 34b. Each output electronics assembly includes a digital-to-analog converter 52 and analog conditioning electronics 54 that are designed to drive the respective projector elements as directed by the computer 38. The output electronics assemblies are conventional and should be understood by those skilled in the art.

The receiver assembly 36 consists of an array of A receiver elements 56, only two of which are illustrated in FIG. 1 and identified as receiver elements 56a and 56b. For example, there may be eighty-eight receiver elements 56, with each capable of providing analog data. The receiver elements 56, which are preferably hydrophones, are conventional and should be understood by those skilled in the art. One example of a suitable receiver array is a receiver array of an STA-020-0 Forward Looking Sonar, which is available from Sonatech, Inc.

A separate input electronics assembly 58, which is conventional and should be understood by those skilled in the art, extends between each of the receiver elements 56 and the input data interface element 46. Each input electronics assembly includes analog conditioning electronics 60 and an analog-to-digital converter 62 which, along with the input data interface element, convert the output of the receiver elements into a proper form for analysis by the processor 40. In this regard, as described below, the input data interface element processes the digital output of the analog-to-digital converters into beam data and performs matched filtering to prepare the output of the receiver elements for analysis by the processor 40. For details of another sonar system that would benefit from the present invention, see U.S. Pat. No. 6,181,643 entitled: *Interferometer with a Single Projector Array and a Single Receiver Array*, issued Jan. 30, 2001 to Richard O. Nielsen, the contents of which are hereby incorporated by reference in their entirety.

Figure 2:
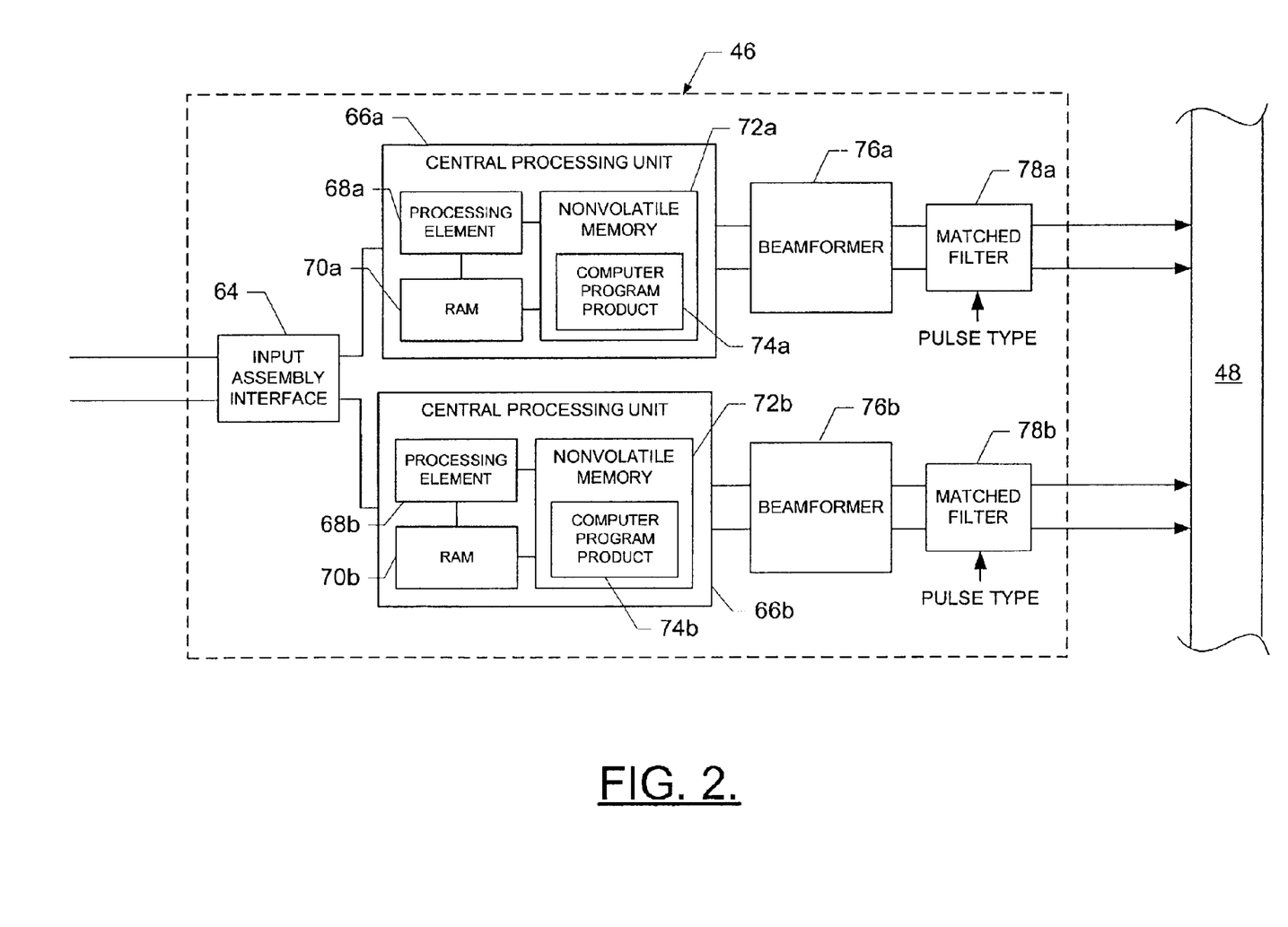
FIG. 2 is a block diagram of an input data interface element of the sonar system depicted in FIG. 1 according to one embodiment of the present invention.

To further highlight the input data interface element 46 in accordance with one embodiment of the present invention, reference is now drawn to FIG. 2. The input data interface element includes an input assembly interface 64 to accept the digital data from the analog-to-digital converters 62a and 62b. To process the digital data, the input data interface element includes central processing units 66 that are capable of signal conditioning the digital data by simultaneously mixing the digital output to baseband, low pass filtering and decimating the digital output, as described below. The central processing units include processing elements 68, and associated memory such as random access memory (RAM) 70, and nonvolatile memory 72. The processing elements can comprise any of a number of different devices, such as personal computers or other high level processors capable of single instruction, multiple data (SIMD) processing that allows the processing element to perform parallel operations on multiple data of the same type. For example, the processing elements can comprise MPC7400 or MPC7410 model microprocessors manufactured by Motorola, Inc. of Schaumburg, Ill., Intel Pentium III model processors manufactured by Intel Corporation of Santa Clara, Calif., or any combination thereof.

The non-volatile memory 72, such as, for example, flash memory, an EEPROM or a disk, is typically used for storing and/or executing computer program products 74 as well as storing various pieces of useful data. Further, the RAM 70 is generally used for loading and executing the computer program product. As described below, the computer program products generally cooperate with respective processing elements 68 to at least partially process the output of the receiver elements 56 in preparation for analysis by the processor 40. It should be understood, however, that even though the computer program products can process the output of the receiver elements, all or a portion of this processing can, instead, be accomplished through various hardware or firmware configurations without departing from the spirit and scope of the present invention.

In addition to the input assembly interface 64 and the central processing units 66, the input data interface element 46 includes beamformers 76, as well as matched filters 78. As known to those skilled in the art, the beamformers are spatial filters that can operate on the output of the receiver elements 56 in order to enhance the amplitude of a coherent signal relative to background noise and directional interference. And as also known, the matched filters perform coherent correlation of direct and echo signal energy in order to further improve the signal-to-noise ratio of the desired signal over background noise.

At this point it should be understood that the ordering of the central processing units 66, and respective beamformers 76 and matched filters 78 of the illustrated embodiment of the input data interface element 46 represent only one of a number of possible configurations of the input data interface element of the present invention. In this regard, the central processing units, and respective beamformers and matched filters can be placed in any order relative to one another without departing from the spirit and scope of the present invention. It should also be understood that even though the beamforners and matched filters are illustrated and described as being separate elements, the central processing units and/or the processor 40 can perform the functions of the beamformers and/or matched filters without departing from the spirit and scope of the present invention. In such an embodiment, the input data interface element would not include separate elements for those respective functions performed by the central processing units and/or the processor. Further, whereas the central processing units are illustrated and described as being separate elements within the input data interface element, the processor can be configured to perform the functions of the central processing units such that the input data interface element does not include separate central processing units.

The computer 38 of the sonar system 30 operates in conjunction with the output electronics assemblies 50 so that a signal s(t) is projected from the projector 32 on a periodic basis. In this regard, in accordance with one method of operation, a waveform corresponding to the signal s(t) may be stored in the memory 42. The waveform is periodically retrieved from the memory by the processor 40, which appropriately directs the waveform to the output data interface 44. The signal s(t) occupies a range of frequencies, or bandwidth, B, that is narrow relative to the center, or carrier frequency, $f_c$, of the respective signal. For example, the signal may have a signal bandwidth of 5 kHz, with a center frequency on the order of 100 kHz to 500 kHz or more. As is known to those skilled in the art, the high center frequency is required in order to achieve the required azimuthal resolution for a given physical sonar length. And the bandwidth is chosen to provide the desired range resolution.

Figure 3:
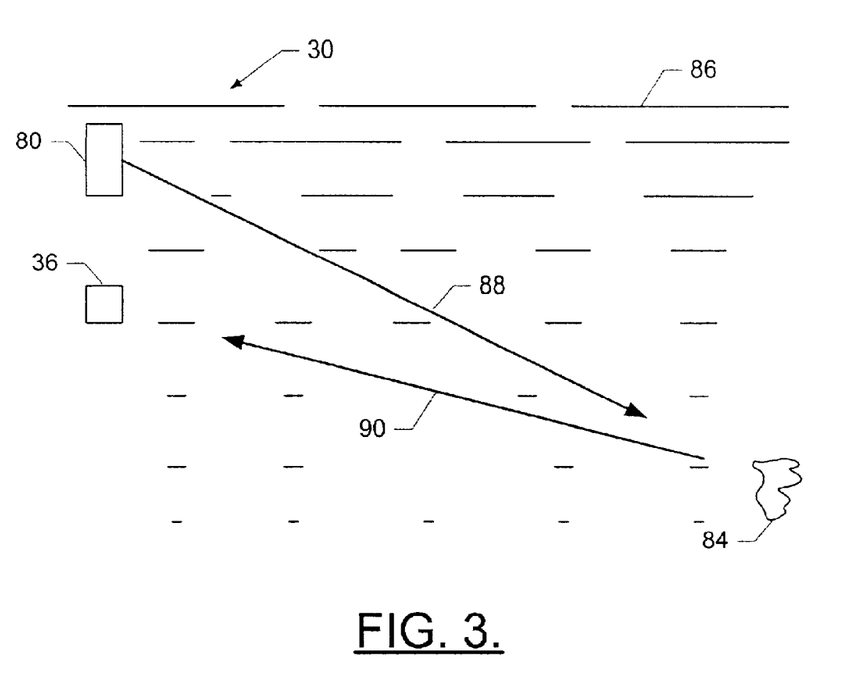
FIG. 3 diagrammatically illustrates the sonar system of one embodiment of the present invention being used to locate an object in a body of water.

Operation of the sonar system 30 may be best understood with reference to FIG. 3, in which the sonar system is illustrated as being used to locate an object 84 suspended within a body of water 86. The projector 80 transmits the signal s(t), with a direction of projection arrow 88 illustrating the direction that the signal s(t) travels from the projector to the object. The signal s(t) is transmitted periodically for a duration that is less than the period. The period will be varied depending upon the distance to the object. Nonetheless, as one example, a suitable period and duration may be 1.0 second and 0.01 second, respectively. A portion of the signal s(t) encounters the object and is reflected back to the receiver assembly 36 of the sonar system as an echo signal 90.

Upon receipt of the receiver data, the sonar system 30 can utilize the receiver data to determine the distance between the sonar system and the object by determining the time required for an echo of the signal s(t) to return to the sonar system from the object. Determination of the distance between a sonar system and an object is conventional and should be understood by those skilled in the art. As such, the sonar system can precisely locate an object. Before the sonar system can utilize the receiver data, however, the input data interface element 46 must process the receiver data in preparation for analysis by the processor. In this regard, according to one embodiment of the present invention, the analog-to-digital converters 62 convert the analog conditioned receiver data from the analog conditioning electronics 60 into digital receiver data. As is known to those skilled in the art, the Nyquist sampling criterion requires that, to properly represent the analog conditioned receiver data, the analog-to-digital converter must sample the data at a frequency that is at least twice that of the highest frequency present in the signal. With the narrowband signal described above, this means that the sampling frequency, $f_s$, of the analog-to-digital converters is typically at least $2f_c+B$. In this regard, in one embodiment the sampling frequency is selected to be four times the center frequency $f_c$.

The input assembly interface 64 receives the digital data, x(n), from the analog-to-digital converters as an A×n matrix of receiver data including receiver data $x_i(n)$ for each receiver element 56 in the array of A receiver elements (where i equals integers 1 through A). The digital data for each receiver element includes t time samples, where n corresponds to each time sample and equals integers 0 through t−1. It should be noted that the number of time samples t is selected to be greater than or equal to the length l of a low pass filter applied to the digital data by the processing elements 68, with the number of time samples generally numbering many times the length of the low pass filter, as described below. In this regard, the matrix of receiver data is arranged such that the first time sample at reference time zero, i.e., n=0, from each receiver element in the array of receiver elements is provided in a contiguous data stream followed by the next time sample, i.e., n=1, from each receiver element in the array in a contiguous data stream, and so on for each subsequent time sample up to time sample t−1. As shown then for an array of eight receiver elements, the input assembly interface receives the digital data x(n) from the entire array (i.e., $x_1(n)$ through $x_8(n)$) as follows:

$$x(n) = \begin{matrix} x_1(n) \\ x_2(n) \\ x_3(n) \\ x_4(n) \\ x_5(n) \\ x_6(n) \\ x_7(n) \\ x_8(n) \end{matrix} = \begin{matrix} x_1(0) & x_1(1) & \cdots & x_1(t-2) & x_1(t-1) \\ x_2(0) & x_2(1) & \cdots & x_2(t-2) & x_2(t-1) \\ x_3(0) & x_3(1) & \cdots & x_3(t-2) & x_3(t-1) \\ x_4(0) & x_4(1) & \cdots & x_4(t-2) & x_4(t-1) \\ x_5(0) & x_5(1) & \cdots & x_5(t-2) & x_5(t-1) \\ x_6(0) & x_6(1) & \cdots & x_6(t-2) & x_6(t-1) \\ x_7(0) & x_7(1) & \cdots & x_7(t-2) & x_7(t-1) \\ x_8(0) & x_8(1) & \cdots & x_8(t-2) & x_8(t-1) \end{matrix}$$

Once received, the input assembly interface 64 passes the digital data to the central processing units 66. For purposes of illustration, then, the digital receiver data, $x_i(n)$ for each time sample, n, of each receiver element 56, i, can be represented as a d by t/d matrix, where d equals a decimation integer and t equals the number of time samples. In this regard, the digital receiver data for each receiver element can be grouped into at least one sub-group, k, where each sub-group includes a plurality of time samples and each time sample for each receiver element belongs to a single sub-group of receiver data.

Then, in representing the receiver data as a matrix, each row of the matrix corresponds to one sub-group. Further, as the digital data is preferably decimated by the decimation integer d, the time samples in each sub-group are arranged in the order in which the time samples were received from the respective receiver element but spaced apart by the decimation integer d. For example, for digital receiver data subsequently decimated by an integer of 4 (d=4) and having t time samples (t≥32), the first sub-group includes time samples n=0, 4, 8, 12, 16, etc. Representing the digital data for each sub-group as a row of a matrix of digital data for each receiver element then, the digital data for each receiver element in the array where d=4 and t≧32 can be illustrated as $xm_i$ as follows:

$$xm_i = \begin{matrix} x_i(0) & x_i(4) & \cdots & x_i(24) & x_i(28) \\ x_i(1) & x_i(5) & \cdots & x_i(25) & x_i(29) \\ x_i(2) & x_i(6) & \cdots & x_i(26) & x_i(30) \\ x_i(3) & x_i(7) & \cdots & x_i(27) & x_i(31) \end{matrix} \cdots$$

It should be noted that whereas the digital data for each receiver element described herein will be described and illustrated in matrix form, the digital data for each receiver element need not be, and are preferably not, organized or processed in matrix form within the sonar system 30. In this regard, to most efficiently and quickly process the digital data, the digital data is preferably processed in the form, x(n), in which analog-to-digital converters 62 provide the digital data to the input data interface element 46 after the data from the receiver elements has passed through the input electronics assembly 58. Also, whereas the number of time samples shown above is greater than or equal to 32, it will be appreciated that the number of time samples will typically include many more than 32, often numbering tens of thousands of time samples.

With the digital receiver data for the array of receiver elements, the processing elements 68, in turn, cooperate with the respective RAM 70 and nonvolatile memory 72 to execute the computer program product 74 to process the digital receiver data to thereby prepare the digital receiver data for analysis by the processor 40. As stated above, the analog-to-digital converters 62 typically sample the analog conditioned receiver data at a rate of at least $2f_c+B$. Such a sampling frequency, however, is excessive because the information in the signal only occupies a bandwidth of B. To avoid requiring all digital signal processing to operate at such a high rate, the processing elements 68 mix the digital receiver data to shift the signal band to a much lower frequency, such as 0 Hz. In this regard, the real and imaginary parts, $u_{Ri}(n)$ and $u_{Ii}(n)$, respectively, of the complex output from mixing the digital receiver data at a sampling frequency $f_s$ with mixing frequency $f_m$ can be represented by the following equations:

$$u_{Ri}(n) = \text{Re}\left[x_i(n)\exp\left(-j\frac{2\pi f_M n}{f_s}\right)\right] = \left\{x_i(0), x_i(1)\cos\left(\frac{2\pi f_M}{f_s}\right),\right. \quad (1)$$
$$\left. x_i(2)\cos\left(\frac{4\pi f_M}{f_s}\right), x_i(3)\cos\left(\frac{6\pi f_M}{f_s}\right), x_i(4)\cos\left(\frac{8\pi f_M}{f_s}\right), \ldots\right\}$$

$$u_{Ii}(n) = \text{Im}\left[x_i(n)\exp\left(-j\frac{2\pi f_M n}{f_s}\right)\right] = \left\{x_i(0), -x_i(1)\sin\left(\frac{2\pi f_M}{f_s}\right),\right. \quad (2)$$
$$\left. -x_i(2)\sin\left(\frac{4\pi f_M}{f_s}\right), -x_i(3)\sin\left(\frac{6\pi f_M}{f_s}\right), -x_i(4)\sin\left(\frac{8\pi f_M}{f_s}\right), \ldots\right\}$$

Based on equations (1) and (2), it can be shown that the cosine and sine factors, respectively, are rather easy to determine if the mixing frequency $f_m$ and the sampling frequency $f_s$ are related as follows:

$$f_m = \frac{f_s}{2^a} \quad (3)$$

In equation (3), a is any positive integer greater than one, but preferably either 2, 3 or 4, as described below. In this regard, it should be noted that for real digital receiver data $x_i(n)$, the signal spectrum cannot contain frequencies greater than or equal to half the sampling frequency. As such, the spectrum for real digital receiver data $x_i(n)$ for a mixing frequency equal to half the sampling frequency (a=1) cannot be centered at the mixing frequency, so no benefit will be derived from mixing the digital receiver data by $f_m$.

For the case where a=2 the mixing frequency is equal to one-quarter the sampling frequency. And solving equations (1) and (2) for the complex output from mixing the digital receiver data yields the following:

$$u_{Ri}(n) = \{x_i(0), 0, -x_i(2), 0, x_i(4), 0, -x_i(6) \ldots \}$$

$$u_{Ii}(n) = \{0, -x_i(1), 0, x_i(3), 0, -x_i(5), 0 \ldots \}$$

As shown, the sine and cosine factors (for a=2) assume the values of 0 and ±1 and repeat every four samples. In fact, the patterns repeat every two samples, but with alternating sign. Similarly, for the case where a is chosen to equal three, the mixing frequency is equal to one-eighth the sampling frequency and the sine and cosine factors repeat every eight samples (or every four samples with alternating sign). And for the case where a is chosen equal to four, the sine and cosine factors repeat every sixteen samples, or every eight samples with alternating sign.

Although the output from mixing the digital receiver data with the mixing frequency $f_m$ lends itself to easy calculation if the sampling frequency and mixing frequency are related as in equation (3) with a selected to be either 2, 3 or 4, it should be noted that to mix the digital receiver data to a frequency lower than the sampling frequency merely requires a mixing frequency that is less than the sampling frequency. Those skilled in the art will also appreciate that these values of mixer frequency $f_m$ do not restrict the applicability of the technique described herein. While in general, the center frequency $f_c$ of the signal spectrum may not be exactly equal to $f_s/2^a$, it will be reasonably close. A typical system will use the technique described in the present invention to signal condition the digital data by simultaneously shifting, i.e., mixing, the input data to a frequency close to 0 Hz, low pass filtering and decimating to a low frequency, as described below. As such, subsequent digital processing that operates at the reduced sampling frequency can make further adjustments in center frequency if desired without departing from the spirit and scope of the present invention. For example, systems that estimate Doppler frequency may require additional frequency adjustment in the digital domain.

Simultaneously with mixing (or shifting the frequency), the processing elements 68 low pass filter the digital receiver data to remove out-of-band energy that would otherwise fold into the signal bandwidth. At the same time, the processing elements can sub-sample the filtered digital receiver data by the decimation integer d to thereby limit the rate of the digital receiver data to be consistent with B Hz, the narrow bandwidth of the signal s(t).

The processing elements 68 process the digital receiver data according to the bit length of the digital receiver data and the SIMD capabilities of the processing element. In this regard, the number of receiver elements, E, for which the processing element can process respective digital receiver data can be determined by dividing the width, V, of the SIMD registers (also called Vector Registers) in the processing element that hold the digital receiver data by the bit length, e, of the digital receiver data, i.e., E=V/e. For example, utilizing a processing element such as the MPC7400 model microprocessor that includes 128-bit wide Vector Registers (V=128), each processing element can process the digital data in multiples of 128 bits. Also, for example, consider A/D converters 62 capable of providing sixteen bits of data at one time (e=16), each processing element then can process the digital receiver data for 8 receiver elements in parallel at one time utilizing the SIMD capabilities of the processing element (i.e., each processing element processes the 16 bits of data of 8 receiver elements for a total of 128 bits).

Then, for receiver assemblies 36 including an array of receiver elements, A, that total more than a number that the processing element can process at one time E (e.g., eight receiver elements), each processing element can repeat the processing steps for each successive subset (1, 2, 3, ... A/E) of the number of receiver elements it can process at one time until the digital receiver data for the entire array of receiver elements has been processed (i.e., E, 2E, 3E, ... A). For example, for receiver assemblies including eighty-eight receiver elements, the processing elements can repeat the processing steps for each subset of eight receiver elements for a total of eleven passes through the processing steps. As used herein, the receiver assembly will generally be selected to include subsets of eight receiver elements. It should be understood, however, that the receiver assembly can include subsets of any number of receiver elements without departing from the spirit and scope of the present invention.

If the total number of receiver elements is not divisible by the number of receiver elements selected for each subset, "dummy" elements with fictitious data can be processed with the final subset to bring the total number of processed elements (receiver elements plus dummy elements) up to a multiple of the number of receiver elements in each subset. Thus, for example, consider a processing element capable of processing digital receiver data for eight receiver elements at one time, and a receiver assembly including seventy receiver elements. One example of such a receive array is a receive array of an SLS-015-2 Side Looking Sonar, which is available from Sonatech, Inc. of Santa Barbara, Calif. In such an instance, eight passes through the processing step would be performed where each subset would still only consist of eight receiver elements, followed by a final (i.e., ninth) pass through the processing step processing the digital receiver data for the last six receiver elements along with fictitious data for two dummy elements. The fictitious data for the dummy elements can be input into the processing element in any one of a number of different manners, such as through analog or digital electronics in the electronics assembly 58.

To process the digital receiver data, the processing elements 68 cooperate with the respective RAM 70 and nonvolatile memory 72 to execute the computer program product 74 to mix the digital receiver data to a baseband frequency and provide a reasonably low data rate for subsequent processing and/or analysis of the digital receiver data. Simultaneously with mixing the digital receiver data, the processing elements can low pass filter the digital receiver data with a length l low pass filter to thereby select the difference frequency component and to attenuate the sum frequency component so as to remove out-of-band energy that would otherwise fold into the signal bandwidth. In this regard, an impulse response vector used to filter the digital receiver data can be represented as a vector of l coefficients as follows: h(w)=h(l−1) h(l−2) h(l−3) ... h(0), where w represents each coefficient and equals l−1 through 0. Similar to the digital receiver data for each receiver element, for purposes of illustration, the impulse response can be represented as a d by l/d matrix as hm follows:

$$hm = \begin{matrix} h((l-1)-(0\times d)) & h((l-1)-(1\times d)) & \cdots & h((l-1)-((l/d-1)\times d)) \\ h((l-2)-(0\times d)) & h((l-2)-(1\times d)) & \cdots & h((l-2)-((l/d-1)\times d)) \\ \vdots & \vdots & \cdots & \vdots \\ h((l-d)-(0\times d)) & h((l-d)-(1\times d)) & \cdots & h((l-d)-((l/d-1)\times d)) \end{matrix} \quad (4)$$

In equation (4), just as in the case of representing the receiver data for each receiver element 56, each row of the impulse response matrix corresponds to one sub-group of the impulse response vector h(w). In this regard, as the digital data is preferably decimated by the decimation integer d, each sub-group of impulse response vector h(w) includes the coefficients of h(w) arranged in the same decreasing order but spaced apart by the decimation integer d. For example, for a low pass filter length l=32 and a decimation integer d=4, the first sub-group of h(w) would comprise h(w) for w=31, 27, 23, 19, etc. Then, using the same example, hm including all of the sub-groups could be represented as follows:

$$hm = \begin{matrix} h(31) & h(27) & h(23) & h(19) & h(15) & h(11) & h(7) & h(3) \\ h(30) & h(26) & h(22) & h(18) & h(14) & h(10) & h(6) & h(2) \\ h(29) & h(25) & h(21) & h(17) & h(13) & h(9) & h(5) & h(1) \\ h(28) & h(24) & h(20) & h(16) & h(12) & h(8) & h(4) & h(0) \end{matrix}$$

As the processing elements 68 mix and low pass filter the digital receiver data, the processing elements decimate the digital receiver data by the decimation integer d to thereby decrease the sampling rate to be consistent with the bandwidth of the digital receiver data, such as to B Hz. In this regard, the decimation integer can be any of a number of different integers that are equal to an integer power of two, e.g., 2, 4, 8, 16, etc.

To speed up the processing of the digital receiver data and enable the input data interface element 46 to process the digital receiver data without "corner turning" or otherwise reordering the data, the processing elements 68 advantageously represent the digital data x(n) received from the analog-to-digital converters 62 as vectorized matrices, or vectorized data matrices, $vx_{jk}$. In this regard, vectorized matrices $vx_{jk}$ each comprise a corresponding sub-group k of digital receiver data for the receiver elements, $x_i(n)$, where j corresponds to each subset of receiver elements (e.g., subsets of eight receiver elements—1, 2, 3 ... A/E). In matrix form then, $vx_{jk}$ can be represented as follows as an E by t/d matrix:

$$vx_{jk} = \begin{matrix} x_1(k-1) & x_1(d+k-1) & x_1(2d+k-1) & \cdots \\ x_2(k-1) & x_2(d+k-1) & x_2(2d+k-1) & \cdots \\ \vdots & \vdots & \vdots & \cdots \\ x_E(k-1) & x_E(d+k-1) & x_E(2d+k-1) & \cdots \end{matrix} \quad (5)$$

In equation (5), E is the number of receiver elements per subset, t is the number of time samples per receiver element and d is the decimation integer. For example, for a first subset of 8 receiver elements 56 (E=8) and a decimation integer of 4, the vectorized digital receiver data $vx_{jk}$ can be represented as follows:

$$vx_{11} = \begin{matrix} x_1(0) & x_1(4) & x_1(8) & \cdots & x_1(28) & x_1(32) \\ x_2(0) & x_2(4) & x_2(8) & \cdots & x_2(28) & x_2(32) \\ x_3(0) & x_3(4) & x_3(8) & \cdots & x_3(28) & x_3(32) \\ x_4(0) & x_4(4) & x_4(8) & \cdots & x_4(28) & x_4(32) \\ x_5(0) & x_5(4) & x_5(8) & \cdots & x_5(28) & x_5(32) \\ x_6(0) & x_6(4) & x_6(8) & \cdots & x_6(28) & x_6(32) \\ x_7(0) & x_7(4) & x_7(8) & \cdots & x_7(28) & x_7(32) \\ x_8(0) & x_8(4) & x_8(8) & \cdots & x_8(28) & x_8(32) \end{matrix} \cdots$$

$$vx_{12} = \begin{matrix} x_1(1) & x_1(5) & x_1(9) & \cdots & x_1(29) & x_1(33) \\ x_2(1) & x_2(5) & x_2(9) & \cdots & x_2(29) & x_2(33) \\ x_3(1) & x_3(5) & x_3(9) & \cdots & x_3(29) & x_3(33) \\ x_4(1) & x_4(5) & x_4(9) & \cdots & x_4(29) & x_4(33) \\ x_5(1) & x_5(5) & x_5(9) & \cdots & x_5(29) & x_5(33) \\ x_6(1) & x_6(5) & x_6(9) & \cdots & x_6(29) & x_6(33) \\ x_7(1) & x_7(5) & x_7(9) & \cdots & x_7(29) & x_7(33) \\ x_8(1) & x_8(5) & x_8(9) & \cdots & x_8(29) & x_8(33) \end{matrix} \cdots$$

$$vx_{13} = \begin{matrix} x_1(2) & x_1(6) & x_1(10) & \cdots & x_1(30) & x_1(34) \\ x_2(2) & x_2(6) & x_2(10) & \cdots & x_2(30) & x_2(34) \\ x_3(2) & x_3(6) & x_3(10) & \cdots & x_3(30) & x_3(34) \\ x_4(2) & x_4(6) & x_4(10) & \cdots & x_4(30) & x_4(34) \\ x_5(2) & x_5(6) & x_5(10) & \cdots & x_5(30) & x_5(34) \\ x_6(2) & x_6(6) & x_6(10) & \cdots & x_6(30) & x_6(34) \\ x_7(2) & x_7(6) & x_7(10) & \cdots & x_7(30) & x_7(34) \\ x_8(2) & x_8(6) & x_8(10) & \cdots & x_8(30) & x_8(34) \end{matrix} \cdots$$

$$vx_{14} = \begin{matrix} x_1(3) & x_1(7) & x_1(11) & \cdots & x_1(31) & x_1(35) \\ x_2(3) & x_2(7) & x_2(11) & \cdots & x_2(31) & x_2(35) \\ x_3(3) & x_3(7) & x_3(11) & \cdots & x_3(31) & x_3(35) \\ x_4(3) & x_4(7) & x_4(11) & \cdots & x_4(31) & x_4(35) \\ x_5(3) & x_5(7) & x_5(11) & \cdots & x_5(31) & x_5(35) \\ x_6(3) & x_6(7) & x_6(11) & \cdots & x_6(31) & x_6(35) \\ x_7(3) & x_7(7) & x_7(11) & \cdots & x_7(31) & x_7(35) \\ x_8(3) & x_8(7) & x_8(11) & \cdots & x_8(31) & x_8(35) \end{matrix} \cdots$$

In the above example, j=1 which, as stated, corresponds to the first subset of receiver elements 56, i.e., i=1 ... 8. As can be seen, then, for a receiver assembly 36 comprising sixteen receiver elements, j=2, vectorized digital receiver data $vx_{jk}$ corresponds to the first subset of receiver elements, and vectorized digital receiver data $vx_{2k}$ corresponds to the second subset of elements, i.e., i=9 ... 16, and so on.

Considering the digital data matrix for each receiver element, $xm_j$, then, the digital receiver matrix $xm_j$ is vectorized into an array of matrices $vx_{jk}$, where each row of the digital receiver matrix $xm_j$ can be represented as one vectorized digital receiver matrix, $vx_{jk}$, where k indicates the row number of the corresponding digital receiver matrix $xm_j$ (e.g., k=1, 2, ... d). As known to those skilled in the art, "vectorizing" refers to adding a dimension to a piece, vector or matrix of data or the like. In this regard, a single point can be vectorized into a 1-dimensional array (or, "vector" hence the term "vectorize"). Likewise, an array is vectorized into a 2-dimensional matrix, and a 2-dimensional matrix is vectorized into a 3-dimenstional structure, often written as "array of matrices" (e.g. vx, vh). By representing the digital receiver data x(n) as an array of matrices $vx_{jk}$, the digital receiver data can then be processed directly within the processing element 68 without corner turning, i.e., transposing, the data.

According to one embodiment, to process the digital receiver data directly within the processing elements 68, each vectorized digital receiver data matrix $vx_{jk}$ of the digital receiver data can be unpacked and converted into p vectorized float matrices, $vf_{jkg}$ and $vf_{jkg}$, where g=1, 2, ... p. The number of vectorized float matrices can be determined in any number of manners, but preferably equals E/F, where F is the number of floating point elements that can fit within the width, V, of the registers in the processing element that hold the digital receiver data. In other words, F equals V/fp, where fp is the floating point data size. For example, for a register width of 128 bits (V=128) and a floating point data size of 32 bits (fp=32), the number of floating point elements, F, that can fit within the processing element at any given time is 4, i.e., 128/32. Converting the vectorized digital receiver data matrix $vx_{jk}$ into p vectorized float matrices, $vx_{11}$ from equation (5) above then can be expressed as p floating point matrices $vf_{111}$ through $vf_{11p}$ (g=1, 2, ... p) having F rows and t/d columns as follows:

$$vf_{11g} = \begin{matrix} x_{F\times(g-1)+1}(0) & x_{F\times(g-1)+1}(d) & x_{F\times(g-1)+1}(2d) & \cdots \\ x_{F\times(g-1)+2}(0) & x_{F\times(g-1)+2}(d) & x_{F\times(g-1)+2}(2d) & \cdots \\ \vdots & \vdots & \vdots & \cdots \\ x_{F\times(g-1)+F}(0) & x_{F\times(g-1)+F}(d) & x_{F\times(g-1)+F}(2d) & \cdots \end{matrix} \quad (6)$$

Similar to representing the digital receiver data, x(n) as vectorized matrices $vx_{jk}$, the impulse response h(w) is similarly vectorized into an array of matrices, $vh_k$. In this regard, vectorized matrices $vh_k$ each comprise a sub-group k of the impulse response vector. In matrix form, then, matrices $vh_k$ can be represented as F by l/d matrices as follows:

$$vh_k = \begin{matrix} h((l-k)-(0\times d)) & h((l-k)-(1\times d)) & \cdots & h((l-k)-((l/d-1)\times d)) \\ h((l-k)-(0\times d)) & h((l-k)-(1\times d)) & \cdots & h((l-k)-((l/d-1)\times d)) \\ \vdots & \vdots & \cdots & \vdots \\ h((l-k)-(0\times d)) & h((l-k)-(1\times d)) & \cdots & h((l-k)-((l/d-1)\times d)) \end{matrix} \quad (7)$$

As above, where the decimation integer equals 4 (d=4) and the length of the low pass filter equals 32 (l=32), the vectorized low pass filter response can be represented as follows:

$$vh_1 = \begin{matrix} h(31) & h(27) & h(23) & h(19) & h(15) & h(11) & h(7) & h(3) \\ h(31) & h(27) & h(23) & h(19) & h(15) & h(11) & h(7) & h(3) \\ h(31) & h(27) & h(23) & h(19) & h(15) & h(11) & h(7) & h(3) \\ h(31) & h(27) & h(23) & h(19) & h(15) & h(11) & h(7) & h(3) \end{matrix}$$

$$vh_2 = \begin{matrix} h(30) & h(26) & h(22) & h(18) & h(14) & h(10) & h(6) & h(2) \\ h(30) & h(26) & h(22) & h(18) & h(14) & h(10) & h(6) & h(2) \\ h(30) & h(26) & h(22) & h(18) & h(14) & h(10) & h(6) & h(2) \\ h(30) & h(26) & h(22) & h(18) & h(14) & h(10) & h(6) & h(2) \end{matrix}$$

$$vh_3 = \begin{matrix} h(29) & h(25) & h(21) & h(17) & h(13) & h(9) & h(5) & h(1) \\ h(29) & h(25) & h(21) & h(17) & h(13) & h(9) & h(5) & h(1) \\ h(29) & h(25) & h(21) & h(17) & h(13) & h(9) & h(5) & h(1) \\ h(29) & h(25) & h(21) & h(17) & h(13) & h(9) & h(5) & h(1) \end{matrix}$$

$$vh_4 = \begin{matrix} h(28) & h(24) & h(20) & h(16) & h(12) & h(8) & h(4) & h(0) \\ h(28) & h(24) & h(20) & h(16) & h(12) & h(8) & h(4) & h(0) \\ h(28) & h(24) & h(20) & h(16) & h(12) & h(8) & h(4) & h(0) \\ h(28) & h(24) & h(20) & h(16) & h(12) & h(8) & h(4) & h(0) \end{matrix}$$

Consider now impulse response matrix hm and that each row corresponds to a sub-group of coefficients of the impulse response vector h(w). As seen, then, each row of the impulse response matrix hm is vectorized into $vh_k$, where k indicates the row number of the impulse response matrix hm (e.g., k=1, 2, ... d).

After vectorizing each row of the impulse response matrix hm, the decimated output of the low pass filter response can be determined based upon the vectorized float matrices and the vectorized impulse response matrices. In this regard, each row of the vectorized float matrices $vf_{jkg}$ corresponding to a sub-group of digital data for a respective receiver element 56 is simultaneously convolved with the corresponding row of the vectorized impulse response matrix $vh_k$, where the rows of each impulse response matrix $vh_k$ correspond to one sub-group of impulse response vector h(w). By convolving $vf_{jkg}$ with $vh_k$, vectorized convolution, $vc_{jkg}$, can be determined according to the following equation:

$$vc_{jkg} = vf_{jkg} \otimes vh_k, \quad (8)$$

where $\otimes$ represents row-by-row (i.e., sub-group by sub-group) convolution. With the convolved rows (sub-groups) from equation (8), the signal conditioning output can then be determined based upon the relationship between the center frequency $f_c$ and the mixing frequency $f_m$, as well as the decimation integer d.

As previously stated with respect to equation (3), for real digital receiver data $x_j(n)$, the signal spectrum cannot contain frequencies greater than or equal to half the sampling frequency. As such, the spectrum for real digital receiver data for a mixing frequency equal to half the sampling frequency (a=1) cannot be centered at the mixing frequency, so no benefit will be derived from mixing the digital receiver data by $f_m$. Thus, beginning with $f_s=4\times f_m$ (a=2) and decimation integers greater than or equal to 4 (d≥4), the signal conditioning output can be determined as follows:

$$y_{Rjg} = \sum_{x=1}^{d/2} (-1)^{x+1} vc_{j(2x-1)g} \quad (9)$$

$$y_{Ijg} = \sum_{x=1}^{d/2} (-1)^x vc_{j(2x)g} \quad (10)$$

For the special (degenerate) case where $f_s=4\times f_m$ and the decimation integer equals 2 (d=2), alternating signs must be incorporated into every other coefficient of the vectorized impulse response matrix $vh_k$ because the patterns of the complex output from mixing the digital receiver data repeat every two samples with alternating signs. For example, a length 16 low pass filter (l=16) with a decimation integer of 2 (d=2), the impulse response for the first vectorized matrix $vh_1$ can be represented as follows:

$$vh_1 = \begin{matrix} h(15) & -h(13) & h(11) & -h(9) & h(7) & -h(5) & h(3) & -h(1) \\ h(15) & -h(13) & h(11) & -h(9) & h(7) & -h(5) & h(3) & -h(1) \end{matrix}$$

After incorporating the alternating signs into vectorized impulse response matrices $vh_k$, the output of signal conditioning can be determined for $f_s=4\times f_m$, d=2 as follows:

$$y_{Rjg}(n) = (-1)^n vc_{j1g} \quad (11)$$

$$y_{Ijg}(n) = (-1)^{n+1} vc_{j2g} \quad (12)$$

For $f_s=8\times f_m$ and decimation integers greater than or equal to 8 (d≥8), the output of signal conditioning can be determined as follows:

$$y_{Rjg} = \frac{q}{\sqrt{2}} + \frac{r}{\sqrt{2}} + s \quad (13)$$

$$y_{Ijg} = \frac{q}{\sqrt{2}} - \frac{r}{\sqrt{2}} + w \quad (14)$$

In equations (13) and (14), q, r, s and w can be determined by equations (15), (16), (17) and (18), respectively, as follows:

$$q = \sum_{x=1}^{d/4} (-1)^x vc_{j(4x)g} \quad (15)$$

$$r = \sum_{x=1}^{d/4} (-1)^{x+1} vc_{j(4x-2)g} \quad (16)$$

$$s = \sum_{x=1}^{d/4} (-1)^{x+1} vc_{j(4x-3)g} \quad (17)$$

$$w = \sum_{x=1}^{d/4} (-1)^x vc_{j(4x-1)g} \quad (18)$$

Just as $f_s=4\times f_m$ (a=2) has a special (degenerate) case where d=2, the case where $f_s=8\times f_m$, (a=3) also has a special case where the d=2, as well as where d=4. Where $f_s=8\times f_m$ and d=2, the mixer outputs every four samples with alternating sign. But in order to rewrite the coefficients of the vectorized impulse response matrix $vh_k$ as a d by l/d matrix, it must be the case where the mixer outputs repeat every two samples, which is true for the case where $f_s=4\times f_m$, not, $f_s=8\times f_m$. Thus, the decimation integer cannot equal 2 when the sampling frequency equals eight times the mixing frequency.

Where $f_s=8\times f_m$ and d=4, the patterns of the complex output from mixing the digital receiver data repeat every four samples with alternating signs. Thus, alternating signs must be incorporated into every four constants of the matrices $vh_k$. For example, consider a length 32 low pass filter (l=32) and a decimation integer d=4, the vectorized impulse response matrix $vh_1$ for the first sub-group of impulse response vector h(w) (i.e., k=1) can be represented as follows:

$$vh_1 = \begin{matrix} h(31) & -h(27) & h(23) & -h(19) & h(15) & -h(11) & h(7) & -h(3) \\ h(31) & -h(27) & h(23) & -h(19) & h(15) & -h(11) & h(7) & -h(3) \\ h(31) & -h(27) & h(23) & -h(19) & h(15) & -h(11) & h(7) & -h(3) \\ h(31) & -h(27) & h(23) & -h(19) & h(15) & -h(11) & h(7) & -h(3) \end{matrix}$$

And after incorporating the alternating signs into matrices $vh_k$, the signal conditioning output can be determined as follows:

$$y_{Rjg}(n) = (-1)^n \left\{ vc_{j1g} + \frac{1}{\sqrt{2}} vc_{j2g} - \frac{1}{\sqrt{2}} vc_{j4g} \right\} \quad (19)$$

$$y_{Ijg}(n) = (-1)^{n+1} \left\{ \frac{1}{\sqrt{2}} vc_{j2g} + vc_{j3g} + \frac{1}{\sqrt{2}} vc_{j4g} \right\} \quad (20)$$

At this point it should be understood that whereas the central processing units 66 can each include one processing element 68 for calculating both the real and imaginary components of a respective subset of the signal conditioning output, each central processing unit can include multiple processing elements for calculating the real and imaginary components, or portions thereof, separately. Similarly, one central processing unit can determine the signal conditioning output for multiple subsets of receiver elements. In such an embodiment, the input data interface element 46 need only include one central processing unit, as well as one beamformer 76 and matched filter 78. By including multiple (as many as 2×A/E) processing elements in each central processing element, each central processing unit can process the digital receiver data in an amount of time equal to the time required to process the digital receiver data with one processing element divided by the number of processing elements.

As an example, consider the processing element having a 128-bit wide Vector Register (V=128), and the digital receiver data bit length of 16 bits (e=16), so that V/e=8. With an array of 16 receiver elements, one processing element 68 of one central processing unit 66 could calculate the real and imaginary components of signal conditioning output for the first subset of eight receiver elements 56, and the aforementioned steps could be simultaneously performed by the processing element(s) of another central processing unit to determine the signal conditioning output for the second subset of eight receiver elements to thereby complete the signal conditioning output for the entire array of 16 receiver elements simultaneously by two central processing units.

Further, it should be understood by those skilled in the art that the processing of real and imaginary components of each subset could be separated and the signal conditioning output can be determined on separate processing elements (not shown). And after signal conditioning, the complex output data can pass through the beamformers 76 and the matched filters 78. In this regard, the beamformers enhance the amplitude of the processed digital receiver data relative to background noise and directional interference to allow the processor 40 to more readily discern the processed digital receiver data relative to the background noise and directional interference. Similarly, the matched filters perform coherent correlations of the pulse type of the transmit signal s(t) in order to further improve the signal-to-noise ratio of the processed digital receiver data over background noise. Once through the beamformers and matched filters, the processed digital receiver data can be analyzed by the processor 40 and/or stored in memory 42.

The sonar system 30 is preferably mounted to a watercraft (not shown), such as an unmanned undersea vehicle, in a manner that should be understood by those skilled in the art. For example, the projector 32 and receiver 36 may be mounted to the external surface of the hull of the watercraft, whereas the remainder of the sonar system 30 may be carried within the watercraft. The sonar system 30 may be for any of the typical applications of sonar, such as: the detection of submarines, torpedoes, water depth, fish, underground pipelines and wrecks; navigation; mapping the ocean floor; determining characteristics of ocean bottom sediments; measuring water current profiles; and the like.

Whereas the present invention is described in the context of a one-dimensional array of receiver elements, in view of this disclosure those skilled in the art will appreciate that the concepts of the present invention can be applied to two-dimensional arrays of receiver elements. Those skilled in the art will also appreciate that the present invention can be implemented through the use of known electrical components and known programming languages, and that based upon this disclosure electrical components can be assembled and software modules can be written to implement the present invention. Further, as stated above, whereas the digital data for each receiver element $xm_i$ described herein are described and illustrated in matrix form, it should be understood that the digital data for each receiver element, need not be, and are preferably not, organized or processed in this matrix form within the sonar system. In this regard, to most efficiently and quickly process the digital data, the digital data is preferably processed according to the entire array of receiver elements in the form in which analog-to-digital converters provide the digital data to the input data interface element after the data from the receiver elements has passed through the input electronics assembly.

Therefore, the present invention is capable of processing digital data from an array of receiver elements without requiring the hardware circuitry that can put undesirable burdens on the space, power, weight and processing capability of a sonar system within which it is employed. Also, the present invention is capable of processing the digital data without corner turning the data in preparation for subsequent processing. As such, the present invention does not suffer from the undesirable slow down caused by corner turning, when no computations are performed during corner turning.

In one advantageous embodiment, portions of the system and method of the present invention, such as portions of the central processing unit 66 include a computer program product 74. The computer program product includes a computer-readable storage medium, such as the non-volatile storage medium, and computer-readable program code portions, such as a series of computer instructions, embodied in the computer-readable storage medium for receiving the handwritten data and for subsequently processing and transmitting the handwritten data as described hereinabove. Typically, the computer program is stored by the central processing unit or a related memory device, such as the non-volatile storage device 72 as depicted in FIG. 2.

In this regard, FIGS. 1 and 2 are block diagrams and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for processing digital data from an array of i receiver elements, wherein the digital data comprises t time samples of receiver data for each receiver element, and wherein n represents each time sample, the method comprising:

providing the digital data from the array of receiver elements, wherein the digital data from the array comprises receiver data, x(n), and wherein the receiver data x(n) comprises receiver data $x_i(n)$ for each receiver element in the array;

providing an impulse response vector h(w) including l coefficients corresponding to a length l low pass filter, wherein w represents each coefficient;

representing the receiver data x(n) as a plurality of vectorized data matrices vx, and the impulse response vector h(w) as a plurality of vectorized response matrices vh; and signal conditioning the digital data x(n) based upon vectorized data matrices vx and the vectorized response matrices vh to thereby determine a signal conditioning output.

2. A method according to claim 1, wherein the digital data has a sampling frequency of $f_s$, wherein mixing the digital data comprises mixing the digital data with a mixing frequency $f_m$ equal to the following:

$$f_m = \frac{f_s}{2^a},$$

and wherein a is selected from a group consisting of 2, 3 and 4.

3. A method according to claim 1, wherein the array of receiver elements includes at least one subset, j, of a predetermined number, E, of receiver elements, wherein providing the digital data comprises providing the digital data from the at least one subset, and wherein the predetermined number of receiver elements E in the at least one subset equals a predefined number of simultaneously processed bits divided by a number of bits included in each time sample of receiver data.

4. A method according to claim 3, wherein the receiver data for each receiving element, $x_j(n)$ and the impulse response vector, h(w), each comprises at least one respective sub-group, k, wherein each sub-group of receiver data for each receiving element includes a plurality of time samples and each sub-group of response data includes a plurality of coefficients, wherein each time sample for each receiving element and each coefficient of the response data belongs to a single sub-group of receiver data and response data, respectively, wherein representing the receiver data as vectorized data matrices vx comprises representing the receiver data as an array of vectorized data matrices including a vectorized data matrix, $vx_{jk}$, for each sub-group of each subset of receiving elements, and wherein representing the impulse response vector as vectorized response matrices vh comprises representing the impulse response vector as an array of vectorized impulse response matrices including vectorized impulse response matrix, $vh_k$, for each sub-group of the impulse response vector.

5. A method according to claim 4 further comprising converting the vectorized data matrix $vx_{jk}$ for each sub-group of each subset of receiving elements into at least one floating point vectorized data matrix, $vf_{jk}$.

6. A method according to claim 5, wherein converting the vectorized data matrix $vx_{jk}$ comprises converting the vectorized data matrix $vx_{jk}$ for each sub-group, k, of each subset of receiving elements into p floating point vectorized data matrices $vf_{jk1}$ through $vf_{jkp}$, wherein p equals E/F, wherein E equals a predetermined number of receiving elements in at least one subset of the receiving elements, and wherein F equals a predefined number of simultaneously processed bits divided by a number of floating point bits.

7. A method according to claim 6, wherein each sub-group, k, of receiver data and each sub-group, k, of the impulse response vector include a plurality of time samples and coefficients, respectively, separated from one another by a decimation integer, d, such that each sub-group of receiver data includes t/d time samples and each sub-group of the impulse response vector includes l/d coefficients, wherein signal conditioning the receiver data comprises signal conditioning the receiver data based upon the following:

$$vc_{jkg} = vf_{jkg} \otimes vh_k,$$

wherein $\otimes$ represents sub-group by sub-group convolution, and wherein g equals integers 1 through p.

8. A method according to claim 7, wherein signal conditioning the receiver data includes decimating the receiver data according to the decimation integer, d, that equals a power of two.

9. A method according to claim 8, wherein decimating the low pass filter response comprises decimating the low pass filter response based upon a relationship between the sampling frequency $f_s$ and the mixing frequency $f_m$.

10. A method according to claim 9, wherein when $f_s$ equals $4 \times f_m$ and the decimation integer d is at least 4, signal conditioning the receiver data comprises signal conditioning the receiver data according to the following:

$$y_{Rjg} = \sum_{x=1}^{d/2} (-1)^{x+1} vc_{j(2x-1)g}$$

$$y_{Ijg} = \sum_{x=1}^{d/2} (-1)^x vc_{j(2x)g},$$

and wherein $y_{Rjg}$ and $y_{Ijg}$ equal the real and imaginary parts of the signal conditioning output.

11. A method according to claim 9, wherein when $f_s$ equals $4 \times f_m$ and the decimation integer d is 2, signal conditioning the receiver data comprises multiplying every other coefficient of every sub-group, k, of the vectorized response matrices, $vh_k$, by $(-1)$ and thereafter signal conditioning the receiver data according to the following:

$$y_{Rjg}(n) = (-1)^n vc_{j1g}$$

$$y_{Ijg}(n) = (-1)^{n+1} vc_{j2g},$$

and wherein $y_{Rjg}$ and $y_{Ijg}$ equal the real and imaginary parts of the signal conditioning output, respectively.

12. A method according to claim 9, wherein when $f_s$ equals $8 \times f_m$ and the decimation integer d is at least 8, signal conditioning the receiver data comprises signal conditioning the receiver data according to the following:

$$y_{Rjg} = \frac{q}{\sqrt{2}} + \frac{r}{\sqrt{2}} + s$$

$$y_{Ijg} = \frac{q}{\sqrt{2}} - \frac{r}{\sqrt{2}} + w,$$

$$\text{wherein } q = \sum_{x=1}^{d/4} (-1)^x vc_{j(4x)g}, \quad r = \sum_{x=1}^{d/4} (-1)^{x+1} vc_{j(4x-2)g},$$

$$s = \sum_{x=1}^{d/4} (-1)^{x+1} vc_{j(4x-3)g} \text{ and } w = \sum_{x=1}^{d/4} (-1)^x vc_{j(4x-1)g},$$

and wherein $y_{Rjg}$ and $y_{Ijg}$ equal the real and imaginary parts of the signal conditioning output, respectively.

13. A method according to claim 9, wherein when $f_s$ equals $8 \times f_m$ and the decimation integer d is 4, signal conditioning the receiver data comprises multiplying every other coefficient of every sub-group, k, of the vectorized response matrices, $vh_k$, by $(-1)$ and signal conditioning the receiver data according to the following:

$$y_{Rjg}(n) = (-1)^n \left\{ vc_{j1g} + \frac{1}{\sqrt{2}} vc_{j2g} - \frac{1}{\sqrt{2}} vc_{j4g} \right\}$$

$$y_{Ijg}(n) = (-1)^{n+1} \left\{ \frac{1}{\sqrt{2}} vc_{j2g} + vc_{j3g} + \frac{1}{\sqrt{2}} vc_{j4g} \right\},$$

and wherein $y_{Rjg}$ and $y_{Ijg}$ equal the real and imaginary parts of the signal conditioning output, respectively.

14. A system for processing digital data from an array of i receiving elements, wherein the digital data comprises t time samples of receiver data for each receiving element, the system comprising:

an input assembly interface capable of providing the digital data from the array of receiving elements, wherein the digital data from the array comprises receiver data, x(n), wherein the receiver data x(n) comprises receiver data, $x_i(n)$ for each receiving element in the array, and wherein n represents each time sample; and a processing element capable of providing an impulse response vector h(w) including l coefficients corresponding to length l low pass filter, wherein w represents each coefficient, wherein said processing element is capable of representing the digital data x(n) as a plurality of vectorized data matrices vx, and the impulse response vector h(w) as a plurality of vectorized response matrices vh, and wherein said processing element is capable of signal conditioning the receiver data x(n) based upon the vectorized data matrices vx and vectorized response matrices vh to thereby determine a signal conditioning output.

15. A system according to claim 14, wherein the digital data has a sampling frequency of $f_s$, wherein said processing element mixes the digital data with a mixing frequency $f_m$ equal to the following:

$$f_m = \frac{f_s}{2^a},$$

and wherein a is selected from a group consisting of 2, 3 and 4.

16. A system according to claim 14, wherein the array of receiving elements includes at least one subset, j, of a predetermined number, E, of receiving elements, wherein said input assembly interface is capable of providing the digital data from the at least one subset, and wherein the predetermined number of receiving elements E in the at least one subset equals a predefined number of bits simultaneously processed by said processing element divided by a number of bits included in each time sample of receiver data.

17. A system according to claim 16, wherein the receiver data for each receiving element $x_i(n)$ and the response data h(w) each comprises at least one respective sub-group, k, wherein each sub-group of receiver data for each receiving element includes a plurality of time samples and each sub-group of response data includes a plurality of coefficients, wherein each time sample for each receiving element and each coefficient of the response data belongs to a single sub-group of receiver data and response data, respectively, wherein said processing element is capable of representing the receiver data x(n) as an array of vectorized data matrices including a vectorized data matrix, $vx_{jk}$, for each sub-group of each subset of receiving elements, and wherein said processing element is capable of representing the impulse response vector into as an array of vectorized response matrices including a vectorized response matrix, $vh_k$, for each sub-group of the impulse response vector.

18. A system according to claim 17, wherein said processing element is further capable of converting the vectorized data matrix $vx_{jk}$ for each sub-group of each subset of receiving elements into at least one floating point vectorized data matrix, $vf_{jk}$.

19. A system according to claim 18, wherein said processing element is capable of converting the vectorized data matrix $vx_{jk}$ for each sub-group of each subset of receiving elements into p floating point vectorized data matrices $vf_{jk1}$ through $vf_{jkp}$, wherein p equals E/F, wherein E equals a predetermined number of receiving elements in at least one subset of the receiving elements, and wherein F equals a predefined number of bits simultaneously processed by said processing element divided by a number of floating point bits.

20. A system according to claim 19, wherein each sub-group, k, of receiver data and each sub-group, k, of the impulse response vector include a plurality of time samples and coefficients, respectively, separated from one another by a decimation integer, d, such that each sub-group of receiver data includes t/d time samples and each sub-group of the impulse response vector includes l/d coefficients, wherein said processing element is capable signal conditioning the receiver data based upon the following:

$$vc_{jkg} = vf_{jkg} \otimes vh_k,$$

wherein $\otimes$ represents sub-group by sub-group convolution, and wherein g equals integers 1 through p.

21. A system according to claim 20, wherein said processing element is capable of signal conditioning the receiver data including decimating the receiver data according to the decimation integer, d, that equals a power of two.

22. A system according to claim 21, wherein said processing element is capable of decimating the receiver data based upon a relationship between the sampling frequency $f_s$ and the mixing frequency $f_m$.

23. A system according to claim 22, wherein when $f_s$ equals $4 \times f_m$ and the decimation integer d is at least 4, said processing element is capable signal conditioning the receiver data according to the following:

$$y_{Rjg} = \sum_{x=1}^{d/2} (-1)^{x+1} vc_{j(2x-1)g}$$

$$y_{Ijg} = \sum_{x=1}^{d/2} (-1)^{x} vc_{j(2x)g},$$

and wherein $y_{Rjg}$ and $y_{Ijg}$ equal the real and imaginary parts of the signal conditioning output, respectively.

24. A system according to claim 22, wherein when $f_s$ equals $4 \times f_m$ and the decimation integer d is 2, said processing element is capable of signal conditioning the receiver data by multiplying every other coefficient of every sub-group, k, of the vectorized response matrices, $vh_k$, by $(-1)$ and thereafter signal conditioning the receiver data according to the following:

$$y_{Rjg}(n) = (-1)^n vc_{j1g}$$

$$y_{Ijg}(n) = (-1)^{n+1} vc_{j2g},$$

and wherein $y_{Rjg}$ and $y_{Ijg}$ equal the real and imaginary parts of the signal conditioning output, respectively.

25. A system according to claim 22, wherein when $f_s$ equals $8 \times f_m$ and the decimation integer d is at least 8, said processing element is capable of signal conditioning the receiver data according to the following:

$$y_{Rjg} = \frac{q}{\sqrt{2}} + \frac{r}{\sqrt{2}} + s$$

$$y_{Ijg} = \frac{q}{\sqrt{2}} - \frac{r}{\sqrt{2}} + w,$$

wherein $q = \sum_{x=1}^{d/4} (-1)^x vc_{j(4x)g}, \; r = \sum_{x=1}^{d/4} (-1)^{x+1} vc_{j(4x-2)g},$ $s = \sum_{x=1}^{d/4} (-1)^{x+1} vc_{j(4x-3)g}$ and $w = \sum_{x=1}^{d/4} (-1)^{x+1} vc_{j(4x-1)g},$ and wherein $y_{Rjg}$ and $y_{Ijg}$ equal the real and imaginary parts of the signal conditioning output, respectively.

26. A system according to claim 22, wherein when $f_s$ equals $8 \times f_m$ and the decimation integer d is 4, said processing element is capable of signal conditioning the receiver data by multiplying every other coefficient of every sub-group, k, of the vectorized response matrices, $vh_k$, by $(-1)$ and thereafter signal conditioning the receiver data according to the following:

$$y_{Rjg}(n) = (-1)^n \left\{ vc_{j1g} + \frac{1}{\sqrt{2}} vc_{j2g} - \frac{1}{\sqrt{2}} vc_{j4g} \right\}$$

$$y_{Ijg}(n) = (-1)^{n+1} \left\{ \frac{1}{\sqrt{2}} vc_{j2g} + vc_{j3g} + \frac{1}{\sqrt{2}} vc_{j4g} \right\},$$

and wherein $y_{Rjg}$ and $y_{Ijg}$ equal the real and imaginary parts of the signal conditioning output, respectively.

27. A system according to claim 14 further comprising a beamformer capable of beamforming the signal conditioning output; and
 a matched filter capable of matched filtering the beamformed signal conditioning output.

28. A computer program product for processing digital data from an array of i receiving elements, wherein the digital data comprises t time samples of receiver data for each receiving element, said computer program product comprising a computer-readable storage medium having computer-readable program code portions stored therein, the computer-readable program portions comprising:
 a first executable portion for providing the digital data from the array of receiving elements, wherein the digital data from the array comprises receiver data, x(n), wherein receiver data x(n) comprises receiver data, $x_i(n)$, for each receiving element in the array, and wherein n represents each time sample;
 a second executable portion for providing an impulse response vector, h(w) including l coefficients corresponding to a length l low pass filter, wherein w represents each coefficient;
 a third executable portion for representing the digital data x(n) as a plurality of vectorized data matrices vx, and the impulse response vector h(w) as a plurality of vectorized response matrices vh; and
 a fourth executable portion for signal conditioning the digital data x(n) based upon vectorized data matrices vx and the vectorized response matrices vh to thereby determine a signal conditioning output.

29. A computer program product according to claim 28, wherein the digital data has a sampling frequency of $f_s$, wherein said second executable portion mixes the digital data with a mixing frequency $f_m$ equal to the following:

$$f_m = \frac{f_s}{2a},$$

and wherein a is selected from a group consisting of 2, 3 and 4.

30. A computer program product according to claim 28, wherein the array of receiving elements includes at least one subset, j, of a predetermined number, E, of receiving elements, wherein said first executable portion provides the digital data from the at least one subset, and wherein the predetermined number of receiving elements E in the at least one subset equals a predefined number of simultaneously processed bits divided by a number of bits included in each time sample of receiver data.

31. A computer program product according to claim 30, wherein the receiver data for each receiving element $x_j(n)$ and the impulse response vector h(w) each comprises at least one respective sub-group, k, wherein each sub-group of receiver data for each receiving element includes a plurality of time samples and each sub-group of response data includes a plurality of coefficients, wherein each time sample for each receiving element and each coefficient of the response data belongs to a single sub-group of receiver data and response data, respectively, wherein said third executable portion represents the receiver data as an array of vectorized data matrices including a vectorized data matrix, $vx_{jk}$, for each sub-group of each subset of receiving elements, and wherein said third executable portion represents the impulse response vector as an array of vectorized impulse matrices including a vectorized response matrix, $vh_k$, for each sub-group of the impulse response vector.

32. A computer program product according to claim 31 further comprising a fifth executable portion for converting the vectorized data matrix $vx_{jk}$ for each sub-group, k, of each subset of receiving elements into at least one floating point vectorized data matrix, $vf_{jk}$ before said fourth executable portion signal conditions the digital data.

33. A computer program product according to claim 32, wherein said fifth executable portion converts the vectorized data matrix for each sub-group, k, of each subset of receiving elements into p floating point vectorized data matrices $vf_{jk1}$ through $vf_{jkp}$, wherein p equals E/F, wherein E equals a predetermined number of receiving elements in at least one subset of the receiving elements, and wherein F equals a predefined number of simultaneously processed bits divided by a number of floating point bits.

34. A computer program product according to claim 33, wherein each sub-group, k, of receiver data and each sub-group, k, of the impulse response vector include a plurality of time samples and coefficients, respectively, separated from one another by a decimation integer, d, such that each sub-group of receiver data includes t/d time samples and each sub-group of the impulse response vector includes l/d coefficients, wherein said fourth executable portion signal conditions the receiver data based upon the following:

$$vc_{jkg} = vf_{jkg} \otimes vh_k,$$

wherein $\otimes$ represents sub-group by sub-group convolution, and wherein g equals integers 1 through p.

35. A computer program product according to claim 34, wherein said fourth executable portion signal conditions the receiver data including decimating the receiver data according to the decimation integer, d, that equals a power of two.

36. A computer program product according to claim 35, wherein said fourth executable portion decimates the receiver data based upon a relationship between the sampling frequency $f_s$ and the mixing frequency $f_m$.

37. A computer program product according to claim 36, wherein when $f_s$ equals $4 \times f_m$ and the decimation integer d is at least 4, said fourth executable portion signal conditions the receiver data according to the following:

$$y_{Rjg} = \sum_{x=1}^{d/2} (-1)^{x+1} vc_{j(2x-1)g}$$

$$y_{Ijg} = \sum_{x=1}^{d/2} (-1)^{x} vc_{j(2x)g},$$

and wherein $y_{Rjg}$ and $y_{Ijg}$ equal the real and imaginary parts of the signal conditioning output, respectively.

38. A computer program product according to claim 36, wherein when $f_s$ equals $4 \times f_m$ and the decimation integer d is 2, said fourth executable portion signal conditions the receiver data by multiplying every other coefficient of every sub-group, k, of the vectorized response matrices, $vh_k$, by (−1) and thereafter signal conditions the receiver data according to the following:

$$y_{Rjg}(n) = (-1)^n vc_{j1g}$$

$$y_{Ijg}(n) = (-1)^{n+1} vc_{j2g},$$

and wherein $y_{Rjg}$ and $y_{Ijg}$ equal the real and imaginary parts of the signal conditioning output, respectively.

39. A computer program product according to claim 36, wherein when $f_s$ equals $8 \times f_m$ and the decimation integer d is at least 8, said fourth executable portion signal conditions the receiver data according to the following:

$$y_{Rjg} = \frac{q}{\sqrt{2}} + \frac{r}{\sqrt{2}} + s$$

$$y_{Ijg} = \frac{q}{\sqrt{2}} - \frac{r}{\sqrt{2}} + w,$$

$$\text{wherein } q = \sum_{x=1}^{d/4} (-1)^{x} vc_{j(4x)g}, \; r = \sum_{x=1}^{d/4} (-1)^{x+1} vc_{j(4x-2)g},$$

$$s = \sum_{x=1}^{d/4} (-1)^{x+1} vc_{j(4x-3)g} \text{ and } w = \sum_{x=1}^{d/4} (-1)^{x+1} vc_{j(4x-1)g},$$

and wherein $y_{Rjg}$ and $y_{Ijg}$ equal the real and imaginary parts of the signal conditioning output, respectively.

40. A computer program product according to claim 36, wherein when $f_s$ equals $8 \times f_m$ and the decimation integer d is 4, said fourth executable portion signal conditions the receiver data by multiplying every other coefficient of every sub-group, k, of the vectorized response matrices, $vh_k$, by (−1) and thereafter signal conditions the receiver data according to the following:

$$y_{Rjg}(n) = (-1)^n \left\{ vc_{j1g} + \frac{1}{\sqrt{2}} vc_{j2g} - \frac{1}{\sqrt{2}} vc_{j4g} \right\}$$

$$y_{Ijg}(n) = (-1)^{n+1} \left\{ \frac{1}{\sqrt{2}} vc_{j2g} + vc_{j3g} + \frac{1}{\sqrt{2}} vc_{j4g} \right\},$$

and wherein $y_{Rjg}$ and $y_{Ijg}$ equal the real and imaginary parts of the signal conditioning output, respectively.

* * * * *